April 13, 1937.    K. B. CANNON    2,076,937
SOUND REPRODUCING MEANS
Filed Nov. 11, 1935    5 Sheets-Sheet 1
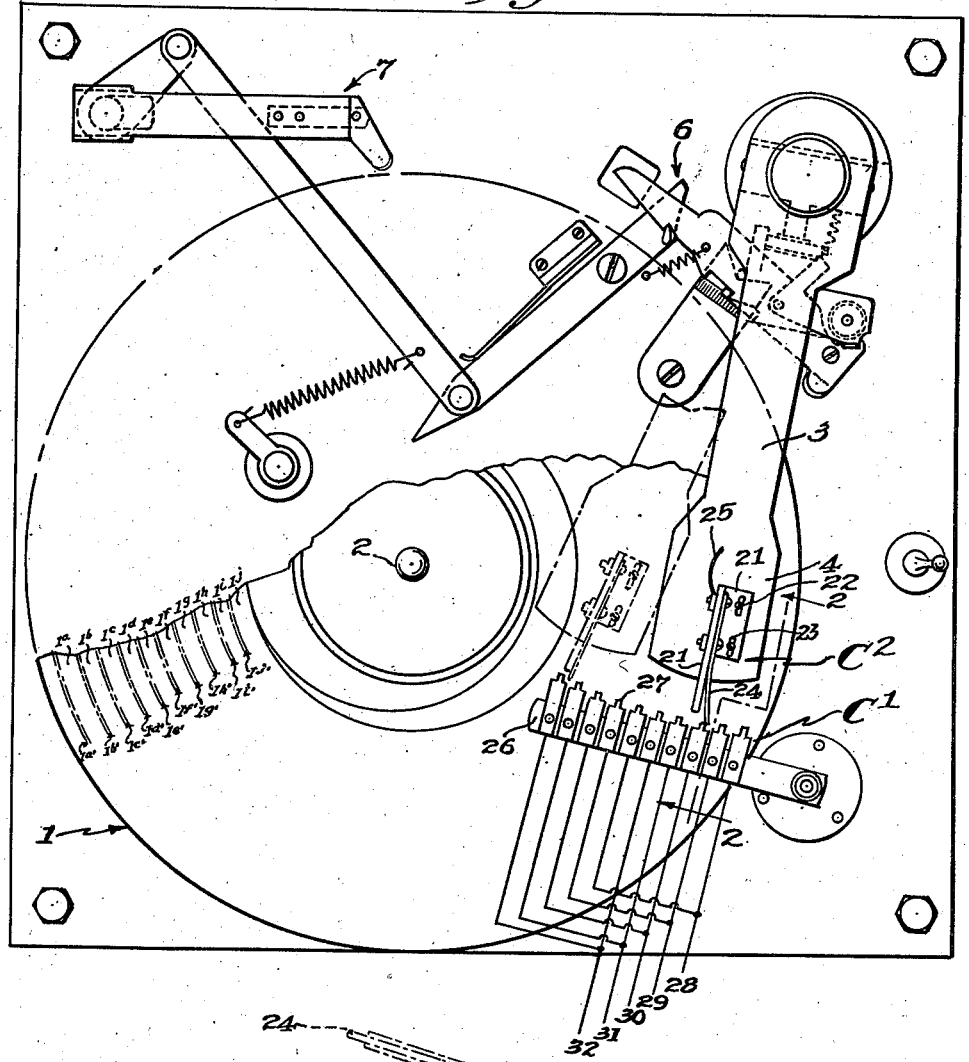
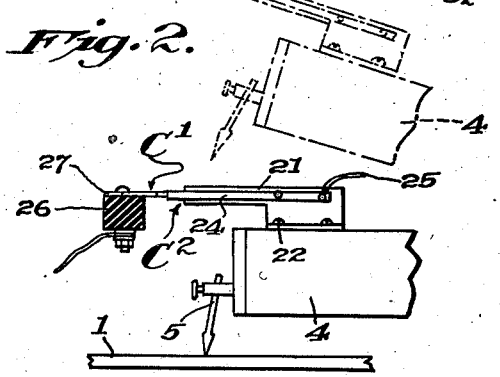
INVENTOR.
Kenneth B. Cannon,
BY
ATTORNEYS.

April 13, 1937. K. B. CANNON 2,076,937
SOUND REPRODUCING MEANS
Filed Nov. 11, 1935 5 Sheets-Sheet 2

INVENTOR.
Kenneth B. Cannon,
BY
ATTORNEYS.

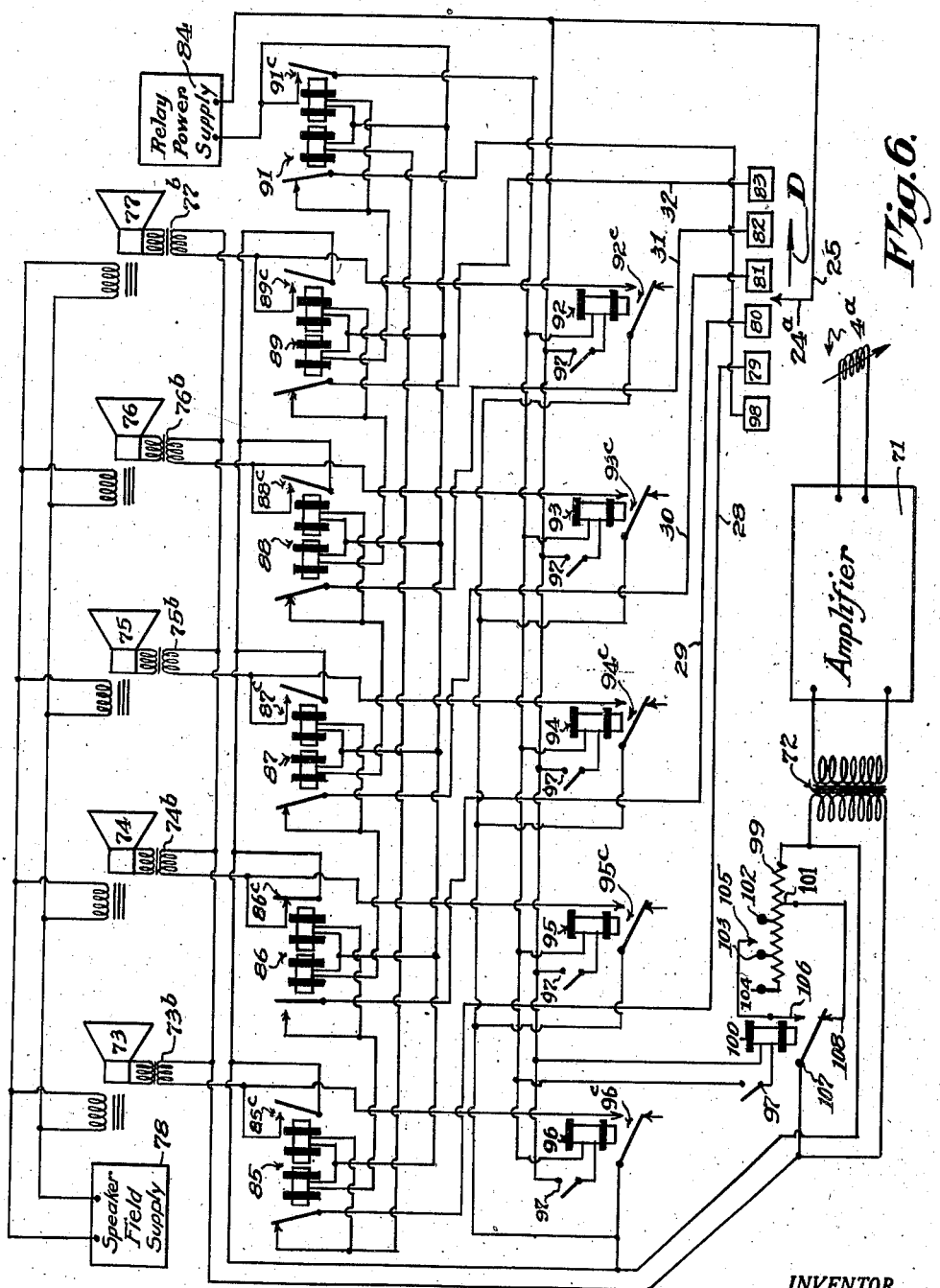

April 13, 1937.　　　K. B. CANNON　　　2,076,937
SOUND REPRODUCING MEANS
Filed Nov. 11, 1935　　　5 Sheets-Sheet 5

INVENTOR.
Kenneth B. Cannon,
BY
ATTORNEYS.

Patented Apr. 13, 1937

2,076,937

UNITED STATES PATENT OFFICE 2,076,937

SOUND-REPRODUCING MEANS

Kenneth B. Cannon, Pasadena, Calif., assignor of fifty per cent to John K. Lyon, Jr., Pasadena, Calif.

Application November 11, 1935, Serial No. 49,214

4 Claims. (Cl. 179—100.4)

This invention relates to sound-reproducing means and pertains particularly to the selective reproduction of recorded sound through a plurality of sound reproducers in a desired sequence.

This invention is particularly adaptable to uses which require the reproduction of a plurality of messages from a sound record or records so that one or more of said messages may be reproduced in one or more sound reproducers at a given location and other messages may be reproduced by other reproducers or groups of reproducers in other locations according to a predetermined time sequence. As an example, the invention would be useful in railway stations for calling trains, wherein a sound reproducer may be mounted adjacent each train gate and associated with a suitable sound record through the device of this invention so that the reproducers adjacent each gate will call each train at a predetermined time.

The device is also useful for handling crowds at lecture demonstrations where it is desired to shift the point of interest according to a predetermined program. As an example, a recorded lecture demonstration may be given in a large hall in which there are a plurality of displays to which the interest of the audience is to be directed in connection with a specialized message for each display, in a predetermined order. In such use, a plurality of sound reproducers may be associated with a suitable sound record through the device of this invention so that a reproducer adjacent each of the displays may be caused to reproduce the pertinent message from the record according to the predetermined sequence, and the attention of the audience is thus automatically directed from display to display according to the subject matter of the lecture at any given instant.

The device is particularly useful for advertising purposes, for example, in relatively large mercantile establishments, such as markets. Sound reproducers may be located in various sections, as in the canned fruit department, the canned meat department, the canned vegetable department, et cetera, and associated through the device of this invention with a sound record having a plurality of separate messages pertinent to canned fruit, canned meat, canned vegetables, et cetera, so that the respective messages may be reproduced in the respective departments according to a predetermined time sequence. Numerous other modifications and uses of the invention will be apparent to one skilled in the art.

A particular object of the invention is to provide a device for associating a plurality of sound reproducing units with a sound record having a plurality of separate messages, so that each of the messages may be reproduced in any number of the sound reproducers according to a predetermined sequence.

Another object of the invention is to provide a device for associating a plurality of sound reproducing units situated in various desired locations, either singly or in groups, with a sound record, so that a preselected portion of the record may be reproduced through a certain reproducer or group of reproducers and other preselected portions may be reproduced through certain other reproducers or groups of reproducers according to a predetermined sequence.

A further object of the invention is to provide a device for associating a plurality of sound reproducing units with a plurality of sound records arranged to be reproduced in a given order, so that a preselected portion of each record may be reproduced through a certain reproducer or group of reproducers and other preselected portions may be reproduced through certain other reproducers or groups of reproducers according to a predetermined sequence.

The device of the present invention may comprise, in general, a pick-up device adapted for translating or converting a physical or optical sound record into electrical impulses, a plurality of sound-reproducing units associated with said pick-up device and adapted to receive said electrical impulses and translate or convert the same into audible sound impulses, and a distributor device associated with both said pick-up device and said reproducing units and operable to effect selective association of one or more of said reproducing units with said pick-up device according to a predetermined sequence.

Further objects of the invention will be specifically set forth in the following description or will be apparent therefrom. Referring to the accompanying figures of drawings:

Fig. 1 is a plan view of an automatic phonograph provided with a contacting mechanism forming a part of this invention;

Fig. 2 is a sectional detail taken on line 2—2 in Fig. 1;

Fig. 6 is a wiring diagram of a modified embodiment of the invention;

Figure 3:
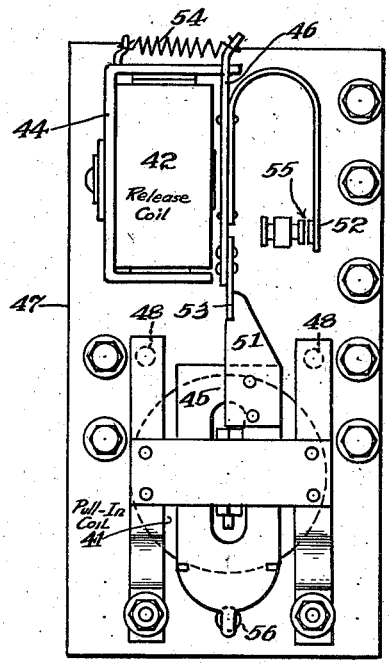
Fig. 3 is a plan view of a mechanically latching relay useful in connection with the present invention.

The apparatus of the present invention may comprise, in one embodiment, a translating device such as a phonograph provided with an electrical pick-up, a plurality of sound reproducers such as electrical speakers, and a distributing switching means associated with said phonograph and said speakers according to an established relation. The phonograph is preferably of the "repeating" type, such as is disclosed in U. S. Patent No. 1,936,335, John R. Mitchell et al., and for simplicity of description I have illustrated this particular form of repeating phonograph in connection with my invention. Referring particularly to Figs. 1 and 2, a record is shown at 1, mounted for rotation about a center 2, and a pivotally mounted tone arm 3 is provided with a pick-up head 4 having a needle member 5 adapted to engage the record 1. The tone arm 3 is adapted for free movement from a position outwardly of the full line position in Fig. 1 to a position inwardly of the dot-dash position therein, following the spiral sound-track provided on said record, and a return mechanism 6 is provided for returning the tone arm 3 to the outer edge portion of the record 1 upon completion of a playing cycle. The return mechanism 6 may be understood to be entirely comparable to the showing in the aforementioned patent, and no specific description thereof is necessary herein.

A stationary contact assembly $C_1$ is provided in position to be engaged by a moving contact assembly $C_2$ which may be disposed on the head 4. The record 1 may be of standard width, and will, according to the present-described embodiment of the invention, be provided with a plurality of separate messages recorded thereon in a spaced relation, there being ten separate messages shown on said record. Inasmuch as the subsequent description will be directed to the employment of five separate speakers, that is, separate speakers at five locations, the last five of the ten separate messages may be substantial repetitions of the first five. It will be appreciated that any desired number of messages may be provided, subject to the dimensional limitations of the particular record employed, and the repetitive arrangement thereof may be dispensed with if desired, without departing from the spirit of the invention.

The moving contact assembly $C_2$ may comprise, in general, a light, rigid base structure 21, adjustably secured to the pick-up head 4 in any suitable manner, as by means of screws 22 extending through slots 23 in the base 21 and engaging said head 4. A contact spring 24 of suitable length, as will be subsequently brought out, is shown attached to the base 21 and a suitable electrical connection 25 is shown secured thereto. The contact spring 24 is preferably electrically insulated from the head 4, either through the use of insulating washers or the like or by forming said head or the base 21 of bakelite or other suitable insulating material.

The stationary contact assembly $C_1$ is shown as comprising a support 26 preferably formed of an electrically non-conducting material such as bakelite, carrying a plurality of contact points 27 corresponding in number to the number of messages (ten, in this embodiment) on the playing record 1, said contacts being associated with certain distributing means, such as electrical relays, for selectively associating the pick-up device 4 with the several sound-reproducing units, as hereinafter described. As above set forth, the second set of five messages on the record 1 are of comparable subject matter to the first five messages, wherefore each of the respective points in the inward set of five may be electrically connected to the corresponding contact point in the outward set of five, and a series of five electrical leads 28, 29, 30, 31, and 32, may be brought from the assembly $C_1$, as shown.

The several messages on the record 1 are indicated at 1a, 1b, 1c, etc., each of the message spaces on said record being preceded by an unrecorded or "blank" space indicated at 1a', 1b', 1c', etc. As the pick-up 4 is moved inwardly of the record 1, the spring contact 24 will "make" with the first of the points 27 (associated with the lead 28) while the needle 5 is playing on the first blank space 1a', and the second point (associated with the lead 29) will be contacted by said spring contact 24 while the needle 5 is in the second blank space 1b', and so on, until the needle has reached the inward limit of the record, whereupon the return mechanism 6 will be actuated and the tone arm and pick-up will be returned to the outer portion of the record 1. In this return movement of said tone arm and pick-up, the needle 5 will be lifted out of contact with the record, and the spring contact 24 will also be lifted out of contact with the points 27, after the manner indicated in dot-dash lines in Fig. 2.

The contact spring 24 is not required to maintain contact with the points 27 for any prolonged period, and may be of such length as to merely "tip" the points when brought in alinement therewith, and is preferably also made relatively lightweight, so that excessive strain is not impressed upon the needle 5 in the contacting operation. Due to the slight eccentricity in the sound grooves of the record 1 normally present, there is a slight tendency for the contact 24 to "wabble" and for this reason I prefer to so arrange the associated electrical assembly that but a momentary contact is required between 24 and the points 27, as hereinafter set forth.

Figure 4:
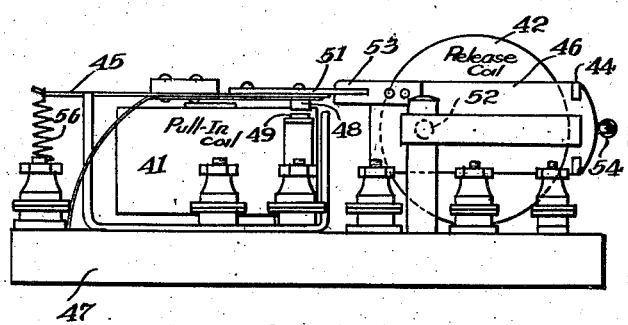
Fig. 4 is a side elevation thereof.

Referring to Figs. 3 and 4, a conventional type of mechanically latching relay is shown as comprising a pull-in coil 41 and a release coil 42, with their respective frames 43 and 44 and armatures 45 and 46, mounted on a suitable base 47. The armature 45 is shown provided with suitable power contacts 48 adapted to engage suitable stationary contacts 49 when the relay is in the closed or latched position, for operating a load circuit. The armature 45 is further provided with a projecting latch portion 51, for reasons which will be described subsequently. The armature 46 is shown provided with a contact arm 52 and a projecting latch member 53, said projection being adapted to slide over the latch portion 51 of the armature 45, due to the action of a suitable spring 54, when the armature 45 is in lowered or closed position, and hold said portion 51 and the contacts 48 in the closed position until the release coil 42 is momentarily energized. The contact arm 52 cooperates with a stationary contact 55 so that an electrical connection is established therethrough when the relay is in the unlatched position and is broken when the relay is in the latched position shown in Fig. 3. Due to the construction of the latch members 51 and 53, the connection between 52 and 55 cannot be broken until the power circuit through contacts 48 and 49 is established and the latch member 51 assumes a position below the lower edge of the member 53; in the particular relay shown the desired operation is dependent upon this characteristic. It will be appreciated that when the release coil 42 is energized while the relay is in the position shown in Fig. 3, the armature 45 will be pulled toward the frame 44, the contacts 52 and 55 will establish an electrical connection, and the latch member 53 will disengage the latch member 51. When the member 51 is free it will rise due to the action of a suitable spring 56 and break the connection between the contacts 48 and 49, assuming the position shown in Fig. 4.

Figure 5:
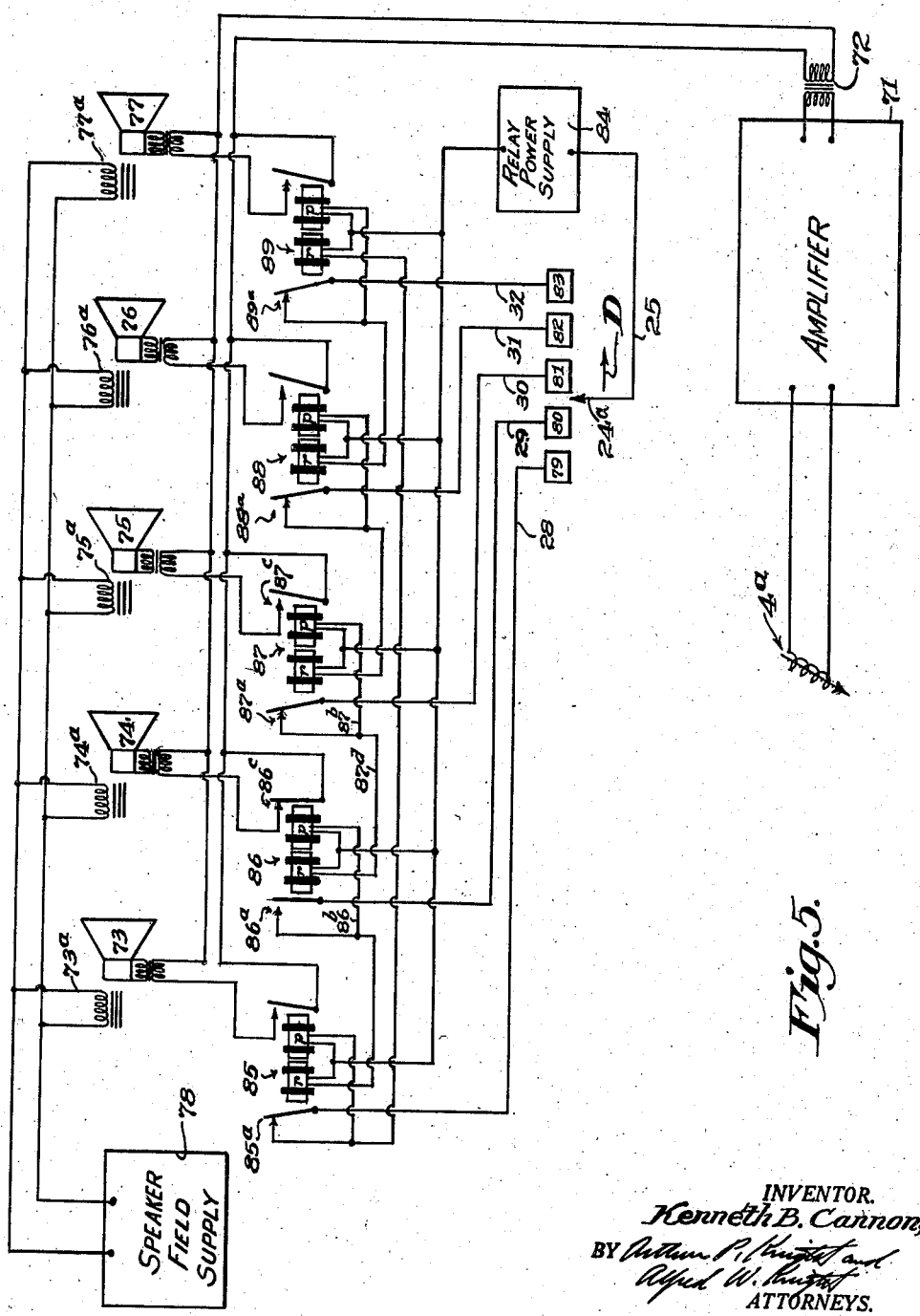
Fig. 5 is a wiring diagram of a simple embodiment of the invention, employing mechanically latching relays.

Fig. 5 illustrates the employment of a plurality of relays of the type shown in Figs. 3 and 4, associated with a plurality of sound reproducers. This form of apparatus is particularly useful for advertising purposes or the like, where it is desired to reproduce sound from a sound record provided with a plurality of separate messages, in such manner that each of said messages is reproduced from a separate reproducer, according to a predetermined sequence. In this figure, the reproducing head or pick-up 4 is shown diagrammatically at 4a, connected to an amplifier 71 terminating in a suitable output transformer 72, such as a 500 ohm line transformer, the secondary of which is connected through the several relays to a plurality of speakers 73, 74, 75, 76, and 77, provided with a field supply as at 78. The moving contact corresponding to the contact assembly C₂ (Figs. 1 and 2) and associated with the pick-up 4a, is shown at 24a, and will be assumed to travel in the direction indicated by the arrow D during playing operation of the pick-up 4a over the record, and make successive contact with a plurality of fixed contacts 79, 80, 81, 82, and 83, corresponding to the fixed contact assembly C₁ in Fig. 1, said contacts being respectively provided with leads as set forth in connection with Fig. 1, namely, 28, 29, 30, 31, and 32, which leads respectively connect with a plurality of relays 85, 86, 87, 88, and 89 of the type shown in Figs. 3 and 4, through the contacts 52—55 thereof, which contacts are respectively indicated in Fig. 5 at 85a, 86a, 87a, 88a, and 89a.

In this particular showing, the movable contact 24a is shown as having already made contact with the fixed contacts 79 and 80, and is about to make contact at 81. As above set forth, the normal position of the relays is such that the contacts 52—55 are in closed position, and the contacts 48—49 are in open position, but due to the previous "make" between 24a and 80, power was supplied from the relay power supply 84 through the leads 29 and 86b to the pull-in coil p of the relay 86 (which coil corresponds to the coil 41 in Figs. 3 and 4), closing the contact 86c of said relay (corresponding to the contacts 48—49, Fig. 4), and thus closing the amplifier circuit to the speaker 74.

When the contact 24a "makes" with the contact 81, current will be supplied to the p coil of relay 87 through the closed contact 87a and the lead 87b, closing the contacts 87c and thus closing the amplifier circuit to the speaker 75, and current will also be supplied to the r or release coil of the relay 86 through the lead 87d, which pulls the armature 46 of the relay 86 into release position, breaking the contacts 86c and opening the circuit of the speaker 74. The procedure is repeated successively until the speaker 77 is energized, and when the tone arm is returned to starting position with respect to the associated sound record, the contact 24a will "make" with the contact 79, disconnecting the speaker 77 and connecting the speaker 73. The return leads for the r and p coils of each relay may be brought together to a common lead which is connected to the relay power supply, as shown.

It will be appreciated that although I have shown a system for the separate reproduction of each part of a record divided into five parts, the record may be divided into any number of convenient parts dependent upon the spacing and number of stationary contacts. Similarly, the system shown is easily adapted to the reproducing of records which are divided into a multiple of five parts, simply by the addition of the necessary stationary contacts, connecting them in the manner shown in Fig. 1. However, the system is also applicable to any convenient number of speakers, from two up to ten or more. It will be further comprehended that the reproducers 73, 74, 75, 76, and 77 may be of any suitable type, i. e., magnetic, electrostatic, piezo-electric, or the like.

In some installations it may be desirable to divide the record into more messages than there are separate reproducing units, and to provide for simultaneous reproduction of one or more of said messages at all of said reproducing units, or at any two or more of such units, and individually reproducing the remaining messages at the different reproducing units. For example, when using the device for advertising purposes it may be desirable, in connection with a record having six messages, to give a general announcement as the first message on the record and to have this announcement reproduced simultaneously at, for example, five separate reproducers and then to have each of five subsequent messages reproduced individually at a separate reproducer, or it may be desirable to reproduce two separate messages at one reproducer and to have the four remaining messages reproduced individually at separate reproducers.

Fig. 6 is a wiring diagram of such a system, showing one method of obtaining the above described modes of operation. The system shown is the same as that in Fig. 5, except that it is shown as comprising an additional latching relay 91 and a plurality of auxiliary non-latching relays 92, 93, 94, 95, 96, and 100; each of the non-latching relays being provided with a suitable switch in series with its operating coil, as at 97. The contact mechanism is also provided with an additional stationary contact 98, placed, in this instance, to be contacted before the contact 79. The relays 92, 93, 94, 95, 96, and 100 are shown connected in parallel to a line leading from the power contacts 91c of the relay 91, and the power contacts 92c, 93c, 94c, 95c, and 96c are shunted across the respective power contacts 89c, 88c, 87c, 86c, and 85c. By closing the desired number of switches 97 the desired number of sound reproducers may thus be connected to the amplifier 71 upon operation of relay 91 associated with the contact 98. Since it may be desirable to operate the amplifier 71 at a constant output level and to operate each sound reproducer at a constant level, the system may be provided with an output padding resistor as at 99 in order to keep the output impedance matched. A satisfactory system may be obtained by providing each of the reproducers with, for example, 500 ohm line transformers as at 73b, 74b, 75b, 76b, and 77b and by providing the output transformer 72 with a 100 ohm secondary. With this arrangement the five reproducers in parallel would match the output transformer without a padding resistor. The padding resistor 99 is shown provided with taps 102, 103, and 104 and a manually movable contact arm 105 which is connected to a stationary contact 106 of the relay 100. The relay 100 is shown as a single pole double throw switch which establishes connection between a moving contact 107 and the stationary contact 106 when the relay is energized and establishes contact between the moving contact 107 and a stationary contact 108 when the relay is not energized, as shown in Fig. 6. When the relay is in the last-mentioned position, the padding resistor 99 is connected across the secondary of the output transformer 72 at a tap 101, providing the proper value of resistance for this particular instance, namely, 125 ohms for single speaker operation. When all of the speakers are to be operated in parallel, all of the switches 97 are closed and the contact 105 moved to a position where it does not make connection with the resistor 99, as would be obvious to those skilled in the art. The values of resistance between the taps 101 and 102, 102 and 103, and 103 and 104, to give the proper impedance match for the parallel connection of two, three, or four speakers is easily calculable by those skilled in the art. Any desired two, three, four, or five speakers may be selected to operate when the relay 91 is energized by the simple expedient of closing the desired combination of switches 97 and selecting the proper tap on the resistor 99 with the contact 105. Since the wiring of the latching relays is the same as that shown in Fig. 5, it is obvious that as the contact 24a moves in the direction indicated by the arrow D and successively makes the contacts 98, 79, 80, et cetera, the relay connected to each of said contacts will be latched and the relay connected to each preceding contact will be unlatched by the same operation.

Figure 7:
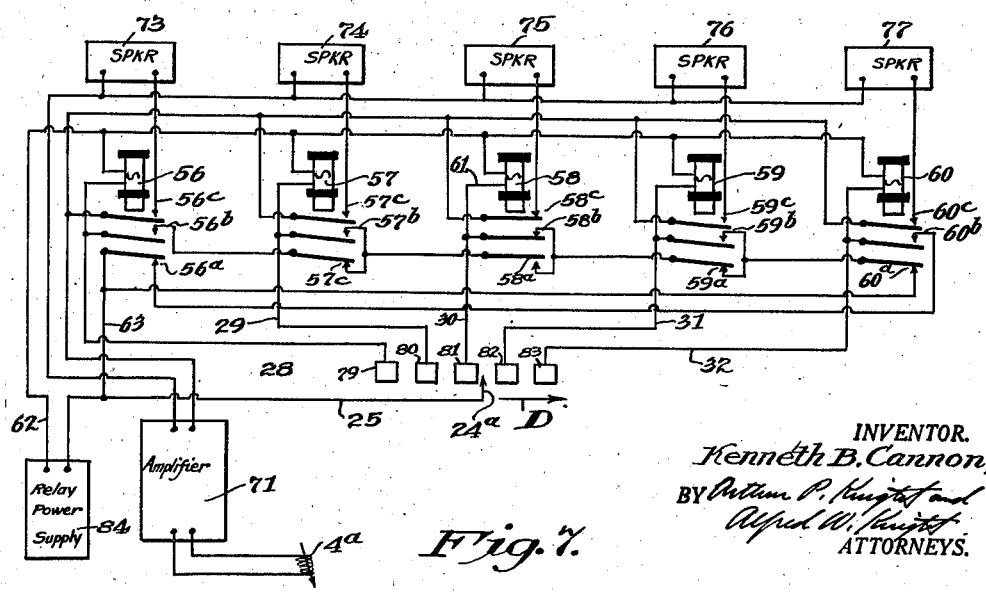
Fig. 7 is a wiring diagram corresponding to Fig. 5, employing electrically latching relays.

The diagrammatic embodiment of the invention shown in Fig. 7 is similar to the showing in Fig. 5 except that electrically locking relays are employed in the place of mechanically locking relays. The relays are shown with three pairs of contacts, one pair normally closed when the relay is in the open or non-energized position and which are opened when the relay closes, and two pair which are open when the relay is open and which close when the relay is closed.

The apparatus of Fig. 7, is shown as comprising suitable sound reproducers or speakers 73, 74, 75, 76, and 77, such as permanent magnet dynamic speakers which may, if desired, have their voice coils direct-connected respectively through relays 56, 57, 58, 59, and 60 to the amplifier 71 which is connected to the pick-up 4a. Since the relays are shown with alternating current coils, the relay power supply 84 may be a step-down transformer or other convenient source of current. It may be assumed for convenience, where direct connection to the speaker voice coils is provided, that the amplifier 71 is equipped with an output transformer and that the output connections from the amplifier are at voice coil impedance, inasmuch as when the speakers are located fairly near to the amplifier the use of line transformers is obviously not necessary. The moving contact 24a may be assumed to be travelling in the direction of the arrow D, and the fixed contacts 79, 80, 81, 82, and 83 are entirely comparable to the like-numbered contacts in Fig. 5.

In this particular showing, the contact 24a is shown as having already made contact with contacts 79, 80, and 81, and is about to make contact at 82. The three separate contacts at each relay comprise a normally closed contact shown at 56a, 57a, etc., which are in the return circuit of the relay coils, and two normally open contacts 56b and 56c, 57b and 57c, etc., the former of which also function in the return circuit of the relay coils and the latter are associated with the respective speakers. Due to the previous "make" between 24a and 81, power was supplied from the relay power supply 84 through the leads 30 and 61 to the coil of relay 58 and thence through the relay power return 62, which caused the several contacts to move to the position shown. The contact 58a was thus opened and the contacts 58b and 58c closed, the former contact being connected at one side to the lead 30 and at the other side through the contacts 59a and 60a of the succeeding relays 59 and 60 to the relay power supply through lead 63. Closure of the contact 58c will place the speaker 75 in connection with the amplifier, as will be clearly understood by reference to the circuit diagram. The contact between 24a and 81 is thus shunted through 58b, 59a, and 60a, and any subsequent "break" or "make" between these contacts 24a and 81 will effect no movement of the relay 58. It will be appreciated that a wabble on the part of the contact 24a as above described may at times take place at the instant of the operation of the relay coil at 58, so that the circuit will be broken at 24a—81 before the contact 58b is closed, and the relay thus caused to "flutter", but inasmuch as I preferably so construct the relays that the "c" contacts therein will not close before the "b" contacts, this flutter is confined to the relay itself and no flutter is produced in the speaker circuit.

When the contact 24a makes with the contact 82, current will be supplied to the coil of the relay 59, closing contacts 59c and 59b, and contact 59a is broken, interrupting the return circuit for the contact 58b and thus opening the relay 58. This operation is cyclic through the apparatus, after the manner above-described in connection with Fig. 5, as will be apparent to one skilled in the art.

The automatic playing characteristics of the phonograph illustrated in Fig. 1 may be taken advantage of, if desired, employing a plurality of records superimposed at the position of the record 1, according to the teaching in the aforementioned Mitchell et al. patent, through the agency of the record-changing mechanism indicated at 7.

In the above-described embodiments of the invention, the distribution of the several recorded messages to the several sound-reproducing units is effected in response to the position of the pick-up device associated with the sound record, in which the definite position of a movable contact member with respect to the messages and the "dead space" between the several messages is relied upon to effect synchronization of the desired speaker with the pick-up device. In the event that an optical type of sound record is employed, such as sound-on-film, it will be appreciated that the mechanical distribution of the several messages on the sound track may not readily be relied upon to effect the desired distribution of such messages to the several reproducing units, and auxiliary operating means must consequently be relied upon to cause operation of the aforementioned relays to properly distribute the current impulses from the pick-up means to the several speakers. This may readily be accomplished by providing a synchronized contact means associated with the travelling film or optical soundtrack, either by a commutator arrangement operatively associated with the means for driving the film, or by other contact means dependent upon the lineal position of the film and its several recorded messages with respect to the pick-up device.

As an alternative embodiment of this invention, I may employ a sound record provided with the desired number of separate messages and a plurality of separate sound recordings playing the part of motivating sound impulses, which may be relied upon to operate the distributing means. This embodiment of the invention is equally adaptable to the use of sound-on-film, sound-on-record, magnetized wire records, tape records, and the like, the motivating impulses being interspersed between the several recorded messages at such interval as to provide ample time for operation of the relay organization responsive thereto. This type of apparatus may be generally designated as "code signal responsive", and in the hereinafter described embodiment the successive or selective connection of the respective sound reproducers is effected through the agency of a sound-sensitive device which is operatively responsive solely to a musical note or other code signal coordinated with the message portions of the sound record, said motivating musical note or code signal being preferably of a frequency other than the normal frequencies present in the recorded messages.

Figure 8:
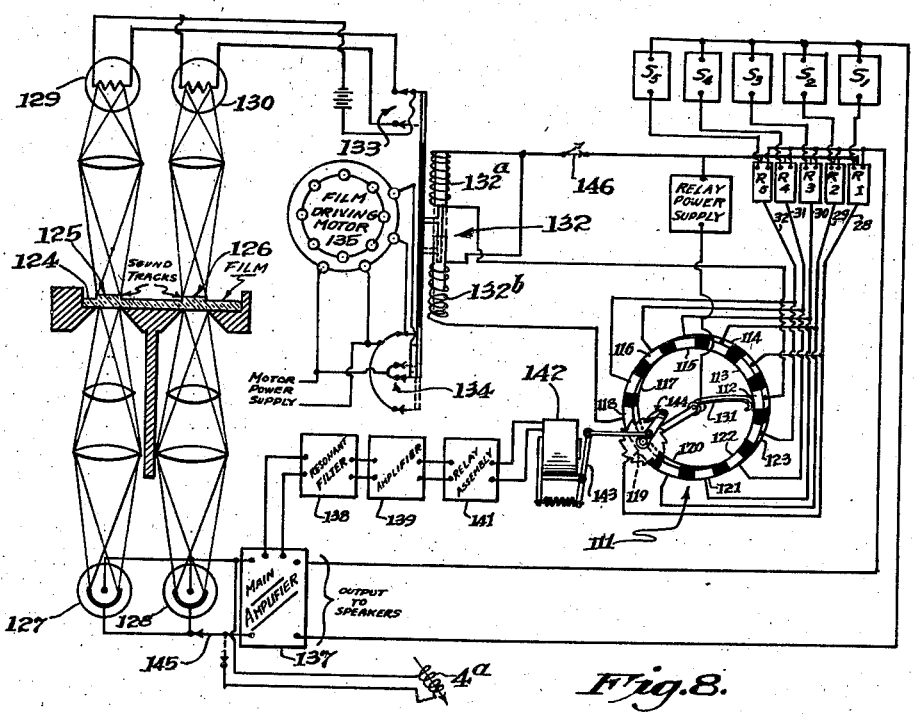
Fig. 8 is a diagrammatic layout of a form of distributing means adapted to function with a sound-on-film or a sound-on-record type of pickup, in response to recorded specific motivating sound impulses associated with the several messages to be selectively distributed to a plurality of sound-reproducing devices.

Referring to Fig. 8, I have shown a form of apparatus equally adapted for use in connection with sound-on-film or sound-on-record, employing a plurality of sound-reproducing units or speakers $S_1$, $S_2$, $S_3$, $S_4$, and $S_5$, respectively associated with suitable relays $R_1$, $R_2$, $R_3$, $R_4$, $R_5$, in any suitable manner, such as hereinbefore brought out in connection with the speakers 73 to 77 and the relays 85 to 89 in Figs. 5 and 6. The several relays are connected to a commutating or distributing device 111 provided with a rotatable contact arm 131 movable into engagement, successively, with a plurality of electrically separate fixed contact segments 112 through 123, of which the segments 113 through 117 correspond respectively to the contacts 79, 80, 81, 82, and 83 (Fig. 5), the segments 119 through 123 being electrically connected to the respective segments 113 through 117. This particular form of apparatus is adapted for use with a film record 124 provided with two separate sound-tracks 125 and 126 which may correspond respectively to the first and second groups of five messages on the record 1 above described, it being appreciated that ample room may be had on a relatively small film such as an eight mm. film for two sound-tracks side by side, in which case both forward and backward movements of the film past the sound pick-up device may be utilized for sound reproduction, by alternate association of such sound-tracks with the sound pick-up means. In the use of this device with a sound-on-film arrangement as herein suggested, the contacts 112 and 118 are employed to effect reversal of the direction of movement of the film and association of the sound pick-up means with the sound-track corresponding to a particular direction of movement of such film. In view of the fact that this type of apparatus is alternatively useful for reproducing a plurality of messages from a wax record or the like, such as above described in connection with Figs. 1 through 7, and in further view of the fact that the pick-up 4a which may be associated with such a record may be mechanically returned to starting position, the respective segments 112 and 118 may be operatively dissociated from the apparatus when a sound-on-record type of recording is employed, as more particularly set forth hereinafter.

Figure 9:
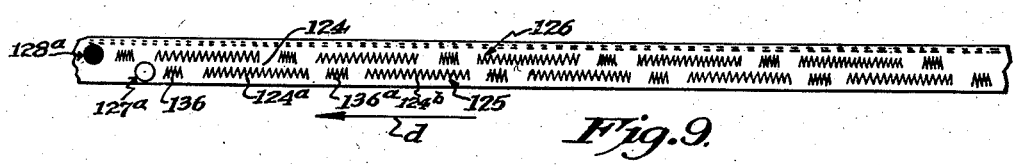
Fig. 9 is a diagrammatic showing of a piece of recorded film useful with the form of device set forth in Fig. 8.
Figure 10:
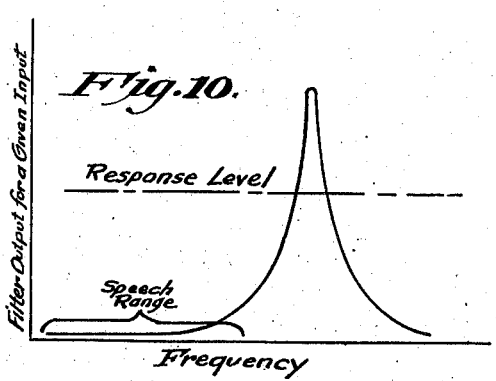
Fig. 10 is a graphic showing of the response characteristics of a filter means useful according to the form of distributing means shown in Fig. 8.

When a double track film sound record is employed, it is obvious that some means must be provided for alternately associating the separate sound-tracks with the sound pick-up device, as by effecting a lateral movement of the film at the termination of its movement in one direction, but I have found that a double sound pick-up device may more readily be employed, in which case some lineal separation thereof in the direction of the length of the film is required due to lateral space limitations. In this case, the several messages in each of the sound tracks 125 and 126 may be displaced lineally of the film as shown in Fig. 9 so as to correspond with the lineal separation of the sound pick-up devices. Referring again to Fig. 8, the separate sound pick-up devices, such as photo-cells, are shown at 127 and 128, and separate exciting lamps 129 and 130 are provided for the respective photocells. It will be apparent from the above that alternate energization of the two lamps 129 and 130 will cause alternate association of the pick-ups 127 and 128 with the tracks 125 and 126. Referring again to Fig. 9, the lineally separated positions of the pick-ups are indicated at 127a and 128a, and the film 124 may be assumed to be at one end of its path of movement, having just completed a movement in the reverse direction to that shown by the arrow $d$. The distributing contact arm 131 (which corresponds to the spring contact 24a shown in Figs. 5 through 7), is in electrical engagement with the segment 112, causing energization of a solenoid 132a forming a part of a reversing switch means 132, to move the switch means to a position such as to close a single-pole double-throw switch 133, providing electrical connection to the filament of lamp 129, and to also reverse a double-pole double-throw switch 134 associated with the reversible film-driving motor 135, whereupon the film will start to travel in the direction of the arrow $d$. Before the first message track 124a reaches reproducing position with respect to the pick-up 127, a motivating code signal recording 136 is brought into position, producing a high frequency electrical impulse which is amplified by the amplifier 137 (corresponding to the amplifier 71 above), passed through a resonant filter 138, thence through an amplifier 139, associated with a relay assembly 141 controlling a solenoid 142 having a spring armature 143 linked to a ratchet drive member 144, causing movement of the contact arm 131 into electrical engagement with the next succeeding segment 113, placing the speaker S₁ across the output leads of the amplifier 137, through the agency of the relay R₁. Sufficient lineal separation is provided between the code signal 136 and the first message 124a to provide adequate time for operation of the relay assembly 141, solenoid 142 and relay R₁, before the aforesaid message is brought into position with respect to the sound head. The code signal is preferably a recording of higher frequency than is present in the several recorded messages, and the resonant filter 138 is so selected as to effectively block current at frequencies corresponding to the speech range within such messages. A typical filter characteristic is illustrated in Fig. 10, in which the speech range may correspond to frequencies up to a suitable limit such as 4,000 and the code signal may correspond to a high frequency of, for example, 8,000, so that sufficient current to operate the relay assembly 141 is allowed to pass the filter 138 only when the output energy level of the code signal amplifier reaches a desired value, as indicated by the horizontal dot-dash line designating the response level of the relay assembly.

Following the message 124a a second code signal is provided as at 136a, which operates the contact 131 as above described and moves the same to electrical engagement with the segment 114, dissociating the speaker S₁, and associating the speaker S₂ with the main amplifier 137 before the succeeding message 124b is brought into register with the sound head. This procedure is repeated, so that successive messages are delivered to the remaining speakers S₃, S₄, and S₅. The contact arm 131 is then brought into electrical engagement with the segment 118, connecting the solenoid 132b, and the associated switch-moving assembly 132 will be moved to a position indicated by the dot-dash lines, reversing the switches 133 and 134, reversing the direction of rotation of the motor 135, extinguishing the lamp 129 and lighting the lamp 130. This switching procedure will thus associate the sound-track 126 with the pick-up 128, the pick-ups 127 and 128 being conveniently connected in parallel to the input circuit of the amplifier 137. The movement of the contact arm 131 past the respective contacts 119 through 123 and 112 will be apparent, completing the cycle of operation of the film travel past the ten separate messages.

When the pick-up 4a is to be employed instead of the photo-electric pick-ups 127 and 128, a suitable switch 145 in the output circuit of the pick-ups 127 and 128 may be opened and made with the circuit of the pick-up 4a, and in view of the fact that reversal of the solenoids 132a and 132b is not necessary, a suitable switch 146 may be opened in the power supply circuit to these solenoids, as will be apparent to one skilled in the art. It will be appreciated that suitable impedance matching transformers or the like may be inserted in the pick-up circuit of either the pick-ups 127 and 128 or the pick-up 4a in order to match the input impedance of the amplifier 137 to allow for alternative use of the two types of pick-ups with a common amplifier, and it will also be apparent that any other type of pick-up may be employed dependent upon the character of the sound record being used with the apparatus. The code signal employed to operate the contact arm 131 may be allowed to pass freely into the speaker circuit, if desired, in view of the fact that the energy level thereof will be relatively low, but it will also be apparent that a suitable resonant filter may be provided in the output circuit of the amplifier 137 to suppress this high frequency signal, without departing from the spirit of this invention.

Other modifications of the present invention within the scope of the present disclosure will be apparent to one skilled in the art, and I do not choose to be limited to the use of the specific apparatus elements herein-disclosed, but rather to the scope of the accompanying claims.

I claim:

1. In a sound-reproducing apparatus, a sound record provided with a plurality of separate messages; means for moving said record; electrical pick-up means associated with said record and adapted to produce electrical impulses therefrom; a plurality of sound-reproducing devices adapted to convert electrical impulses into sound impulses; a relay unit associated with each of said sound-reproducing devices and operable to associate its corresponding sound-reproducing device with said pick-up means; a plurality of spaced contact members in relatively fixed position with respect to said record and said pick-up means, each of said contact members being electrically associated with one of said relay units; a movable contact adapted to successively engage each of said plurality of contacts and successively energize the corresponding relay unit by such contact; and means for moving said movable contact member with respect to said fixed contact members to cause successive connection of said pick-up means to different sound-reproducing devices through operation of said relay means during the movement of said record to cause reproduction of said separate messages at different sound-reproducing devices in a predetermined sequence.

2. In a phonograph type sound-reproducing apparatus, the combination which comprises: a tone-arm carrying a pick-up device; movable contact means associated with said tone-arm; a plurality of fixed contacts positioned to be individually contacted by said movable contact means; a plurality of speakers; a relay unit associated with each of said fixed contacts and each operable to associate one of said speakers with said pick-up device; power supply means for said relays electrically associated therewith through operating circuit means including said movable contact means and the respective fixed contacts, and said movable contact being adapted to successively engage each of said fixed contacts during playing operation of said tone-arm to successively close the operating circuits of the relay units associated with the respective fixed contacts and cause successive association of said speakers with said pick-up device in a predetermined sequence.

3. In a sound-reproducing apparatus, a sound record provided with a plurality of separate messages; means for moving said record; electrical pick-up means associated with said record and adapted to produce electrical impulses therefrom; a plurality of sound-reproducing devices adapted to convert electrical impulses into sound impulses; a relay unit associated with each of said sound-reproducing devices and operable to associate its corresponding sound-reproducing device with said pick-up means; a plurality of spaced contact members in relatively fixed position with respect to said record and said pick-up means, each of said contact members being electrically associated with one of said relay units; a movable contact adapted to successively engage each of said plurality of contacts to successively energize the corresponding relay unit by such contact and de-energize a relay unit associated with a preceding contact; and means for moving said movable contact member with respect to said fixed contact members to cause successive connection and disconnection of said pick-up means to different sound-reproducing devices through operation of said relay means during the movement of said record to cause reproduction of said separate messages at different sound-reproducing devices in a predetermined sequence.

4. In a phonograph type sound-reproducing apparatus, the combination which comprises: a tone-arm carrying a pick-up device; movable contact means associated with said tone-arm; a plurality of fixed contacts positioned to be individually contacted by said movable contact means; a plurality of speakers; a relay unit associated with each of said fixed contacts and each operable to associate one of said speakers with said pick-up device and to dissociate another of said speakers from said pick-up device; power supply means for said relays electrically associated therewith through operating circuit means including said movable contact means and the respective fixed contacts, and said movable contact means being adapted for successive engagement with each of said fixed contacts during playing operation of said tone-arm to successively close the operating circuits of the relay units associated with the respective fixed contacts and to open the operating circuit of the relay unit associated with the next preceding fixed contact and cause successive association and dissociation of said speakers with said pick-up device in a predetermined sequence.

KENNETH B. CANNON.